(No Model.)
E. H. LUNKEN.
LUBRICATOR.
No. 492,091. Patented Feb. 21, 1893.
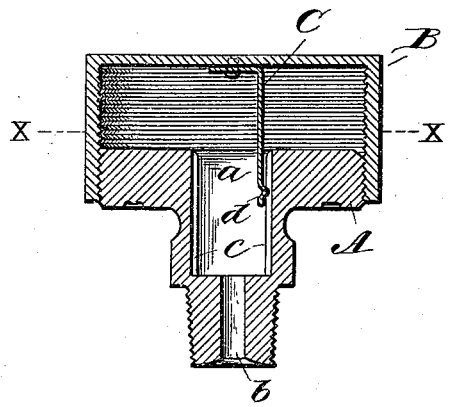
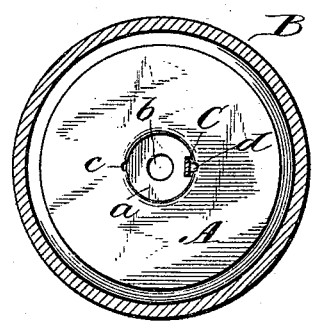
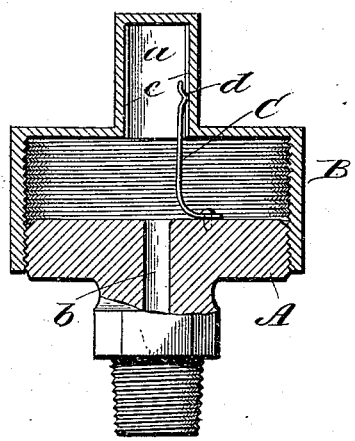
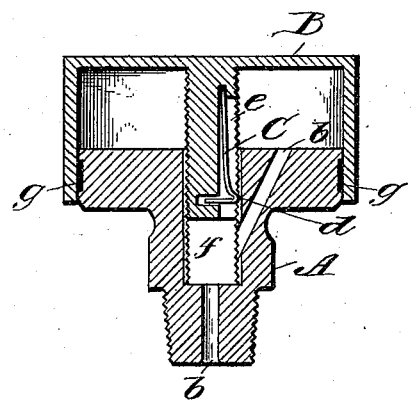
Witnesses.
J. Thomson Cross
Bernard J. Hausfeld
Inventor:
Edmund H. Lunken
by Chas. M. Peck
his Attorney.

UNITED STATES PATENT OFFICE.

EDMUND H. LUNKEN, OF CINCINNATI, OHIO, ASSIGNOR TO THE LUNKENHEIMER COMPANY, OF SAME PLACE.

LUBRICATOR.

SPECIFICATION forming part of Letters Patent No. 492,091, dated February 21, 1893.

Application filed November 16, 1892. Serial No. 452,128. (No model.)

*To all whom it may concern:*

Be it known that I, EDMUND H. LUNKEN, a citizen of the United States, residing at Cincinnati, in the county of Hamilton and State of Ohio, have invented certain new and useful Improvements in Grease-Cups, of which the following is a full, clear, and exact description, reference being had to the accompanying drawings, forming part of this specification.

My invention relates to grease cups for lubricating journals and bearings; and it has for its object the improved construction of such cups whereby the parts when adjusted upon each other cannot jar loose under the vibrations of the machinery to which they may be attached.

The novelty of my invention will be hereinafter set forth and specifically pointed out in the claims.

In the accompanying drawings:—Figure 1, is a central sectional elevation of a grease cup embodying my invention. Fig. 2, is a sectional plan view on the dotted line *x—x* of Fig. 1. Fig. 3, is a corresponding view to Fig. 1, showing a modification in the construction. Fig. 4, is a corresponding view to Fig. 1, showing a still further modification in the construction.

The same letters of reference are used to indicate identical parts in all the figures.

The base of the cup A, Fig. 1, is exteriorly threaded at its upper end so that the inverted interiorly threaded cup B containing the grease or lubricant may be screwed thereon, and its lower end is suitably formed for attachment to a journal or bearing, in this instance by being exteriorly threaded as shown. In the upper part of the base is a central cylindrical recess or bore *a* which terminates at its lower end in an outlet *b*, through the shank of the base, for the escape of the lubricant. In the recess *a* there are as many notches *c* extending from the top to the bottom as may be desired. In this instance I have shown but two of such notches vertically and diametrically arranged.

Fastened to the under side of the top of the cup is a spring C whose lower end enters the recess *a* and has upon it a projecting detent *d* which is in constant tension with the side wall of the recess and snaps into the notches *c* when brought opposite them. This detent forms a lock between the base and the cup which while not sufficiently strong to prevent the screwing down of the cup to eject the lubricant, yet is sufficiently strong to prevent the jarring loose of the cup from the base after adjustment. In the use of these cups upon certain machinery, such as street-car motors where there is constant jarring the cup, without some sort of a lock, would soon jar loose and fall off, but by my simple arrangement of a locking detent this cannot happen.

I do not wish my invention to be understood as limited to the location of the detent or its attachment to one of the members alone for this might be varied in a variety of ways. For instance, in Fig. 3, I have transferred the recess *a* from the base to the top of the cup by placing a raised cap thereon, and I have secured the spring to the base as shown. Again in Fig. 4 I have shown the application of my invention to a well known form of cup where the screw *e* for lowering and raising the cup is carried by the latter at its center and engages a tapped recess *f* in the base. Here the spring is secured in a slot in the screw *e* and its detent engages notches in the recess *f*. In Figs. 1 and 2, instead of notches in the recess *a*, ribs might be formed therein to answer the same purpose, as will be readily understood. Any suitable packing as *g* may be applied to the base where the cup fits over it to prevent leakage.

Having thus fully described my invention, I claim—

1. In a grease cup the combination of an attaching base with an aperture for the escape of the grease, an inverted cup fitted thereon and lowered by screw action, and a yielding detent interposed between said base and cup, for the purpose specified.

2. The base A having a threaded periphery, recess *a*, and outlet *b*, in combination with the interiorly threaded cup B carrying the spring C whose lower end is provided with a detent entering the recess *a* and engaging notches or ribs therein, substantially as and for the purpose specified.

EDMUND H. LUNKEN.

Witnesses:
GEORGE S. BAILY,
BERNARD F. HANSFELD.